United States Patent [19]

Nakamura et al.

[11] Patent Number: 4,708,215

[45] Date of Patent: Nov. 24, 1987

[54] AUTOMATIC WEIGHING SYSTEM

[75] Inventors: Toru Nakamura, Kyoto; Satoshi Konishi, Kusatsu; Seiji Yamada, Kyoto; Masahiko Tatsuoka, Siga; Michihiro Kubo, Kusatsu, all of Japan

[73] Assignee: Ishida Scales Manufacturing Company, Ltd., Kyoto, Japan

[21] Appl. No.: 762,722

[22] Filed: Aug. 5, 1985

[30] Foreign Application Priority Data

Aug. 8, 1984 [JP] Japan ............................ 59-164788
Nov. 6, 1984 [JP] Japan ............................ 59-167485[U]
Nov. 12, 1984 [JP] Japan ............................ 59-170328[U]

[51] Int. Cl.⁴ .................... G01G 19/22; G01G 13/16; G01G 23/10; E16K 31/52
[52] U.S. Cl. ........................... 177/25; 177/109; 177/185; 177/DIG. 11; 222/504
[58] Field of Search ............... 177/25.18, 108, 109, 177/185, DIG. 11; 222/504

[56] References Cited

U.S. PATENT DOCUMENTS

| | | | |
|---|---|---|---|
| 1,319,105 | 10/1919 | Muirhead | 177/109 X |
| 4,396,080 | 8/1983 | Dee | 177/185 |
| 4,398,612 | 8/1983 | Mikami et al. | 177/25 |
| 4,520,883 | 6/1985 | Fukuda | 177/25 X |
| 4,520,884 | 6/1985 | Mikami | 177/109 |
| 4,635,831 | 1/1987 | Kinoshita | 177/25.18 |

Primary Examiner—George H. Miller, Jr.
Attorney, Agent, or Firm—Flehr, Hohbach, Test, Albritton & Herbert

[57] ABSTRACT

A combinational weighing system with a plurality of article batch handling means has an article feeding means for feeding articles to be weighed into the individual article batch handling means, and after a desired combination or weights within a preselected range is determined by a computer, the article batches from the selected article batch handling means are discharged together to be made into a package. The system also includes a means for measuring the weight of the article accumulated on the article feeding means and the output signal from such a weight-measuring means is transmitted to control the operation of a conveyor for supplying the articles to the article feeding means.

21 Claims, 17 Drawing Figures

AUTOMATIC WEIGHING SYSTEM

BACKGROUND OF THE INVENTION

This invention relates to an automatic weighing system and more particularly to an automatic weighing system of a combinational weighing type. It further relates to a device for feeding articles to such a system in a reliable manner and an energy- and space-saving hopper-driving means.

There are many kinds of particle-like products such as peanuts and block-type products such as green peppers which are being sold in stores and supermarkets. When they are displayed for sale, it is frequently required to package them in units of a predetermined weight. In such a situation, it is necessary not only to make absolutely certain that each package should contain at least the predetermined weight but also to minimize the excess weight of each package over this predetermined level. Since any process involving manual weighing is out of the question, automatic weighing and packaging systems of many types have come to be popularly used.

U.S. Pat. No. 4,398,612 issued Aug. 16, 1983 and assigned to the present assignee discloses an automatic weighing system of a combinational weighing type having a number of article batch handling units arrayed radially. Articles to be weighed are typically transported by a conveyor and dropped onto an article feeding system which distributes them into the individual article batch handling units. Weight-measuring means associated with the individual article batch handling units are electrically connected to a computer which computes combinations of weight values obtained from these weight-measuring means and selects a combination according to a predetermined criterion such as the combination which gives a total weight that is within a preselected range.

The invention as disclosed in U.S. Pat. No. 4,398,612 such as Models CCW-201RLC and CCW-211RLC manufactured and sold by the assignee corporation has revealed the desirability of certain improvements. The apparatus utilized according to the aforementioned patent as well as the aforementioned models for controlling the rate at which the articles to be weighed are supplied to the article batch handling units comprises a light-emitting element and a light-receiving element forming together a photoelectric sensor system. The article feeding system includes a dispersion table and a decision whether or not to bring in more articles to be weighed is made by determining with the aforementioned sensor system whether the pile of the articles to be weighed as accumulated on the dispersion table is high enough to block the beam from the light-emitting element.

The method of controlling the rate of supply as outlined above could be made still more accurate if the weight, rather than the height, of the articles on the dispersion table is depended upon in deciding whether or not to drive the conveyor to bring additional articles to the article feeding system. In other words, since the intermittent discharging of the articles at the bottom is controlled to be at a predetermined rate measured in weight, the system can be operated more dependably if the supply of the same articles from above is also controlled by weight. It is because the height of a pile is not an accurate measure of its weight especially where, as here, the articles constituting the pile are vibrating so that the shape of the pile is likely to keep changing, and there is not simple relationship to be expected between the actual rate of supply and that of discharge.

SUMMARY OF THE INVENTION

It is therefore an object of the present invention to generally improve upon prior art automatic weighing systems.

It is another object of the present invention to provide a combinational weighing system with an improved article feeding means by means of which articles to be weighed can be supplied at a reliably stable rate.

It is still another object of the present invention to provide a combinational weighing system with hopper-driving means with improved efficiency.

It is a further object of the present invention to provide a combinational weighing system with hopper-driving means which allow a compact design of the system.

It is still another object of the present invention to provide a combinational weighing system equipped with hoppers that can discharge their contents with improved efficiency.

It is still a further object of the present invention to provide a combinational weighing system which allows an easy inspection inside its weigh hoppers by reflection of light.

The above and other objects of the invention are attained by providing an automatic combinational weighing system comprising one or more separate article batch handling units for receiving, weighing, storing and discharging individual article batches, article feeding means which serve to feed individual article batches to the article batch handling units, a conveyor driving means for driving a conveyor to transport articles to the article feeding means, a means coupled to the article feeding means for measuring the weight, not the height, of articles accumulated on the article feeding means, and conveyor control means which serve to acquire weight information from the aforementioned weight measuring means and to control the motion of the conveyor control means according to the acquired weight information. If the article feeding means includes a vibratory dispersion table on which the articles are dropped from the conveyor and feed troughs which are individually associated to the article batch handling units, the weight measuring means may be adapted to weigh the articles while they are on the vibratory dispersion table, or the weights of those already in the feed troughs may be included in the measurement.

In another aspect of the present invention, hoppers which may be used in the article batch handling units are adapted to open widely so that the contents temporarily stored therein can be discharged quickly and smoothly. These hoppers may each include a main body defining an article receiving upper opening and an article discharging lower opening, a gate adapted to swing with respect to the main body and to close the article discharging lower opening, a bracket which is secured to and extending from the main body and a linkage means for rotatably linking the gate with the main body. The linkage means is secured at one end to the gate and rotatably affixed to the bracket around a pin which defines an axis of rotation external to the main body. The linkage means further comprises a toggle means and is adapted to be subjected to an external force for opening the gate. Preferably, such external force for opening the gate is supplied from a central motor without the aid of a linearly reciprocating power-transmission rod so that a compact, energy-saving system can be provided.

In a further aspect of the present invention, such a hopper gate operating system may comprise a drive shaft adapted to rotate around its axis with a cam mounted thereon, and a rotatably supported lever means with one end in an engaging relationship with the cam and the other end adapted to apply a force to the hopper gate to be opened. Preferably, the article batch handling units each having a pool hopper and a weigh hopper are circularly arrayed and the individual hopper gate operating systems are powered by a central motor through a central gear connected to the motor. Gate control means are individually associated with an article batch handling unit and may each comprise a pinion engaged to the central gear, a drive shaft affixed to and adapted to rotate with the pinion, a cam mounted on the shaft through a cam control means which includes a clutch and a brake, a cam lever having a cam follower engaged with the cam, and a lever support means for supporting the cam lever rotatably. The cam lever is adapted to exert a linear force on the linkage means of the hopper, thereby opening the gate without the necessity of a power-transmitting rod for converting the rotary motion of the motor to the linear motion of the linkage means. Where the article batch handling units each include a pool hopper for temporarily storing an article batch and a weight hopper therebelow for receiving an article batch therefrom and weighing it, it is further preferable to provide a reflective surface to the pool hopper so as to enable a user to inspect the interior of the weigh hopper easily from a safe distance by the reflection of light.

Additional features of this invention will become apparent to those skilled in the art from an analysis of the following description of some specific embodiments.

DETAILED DESCRIPTION OF THE INVENTION

According to an embodiment of the present invention illustrated in FIGS. 1 through 4, numeral 1 generally indicates a computerized combinational weighing system with about ten to fifteen article batch handling units circularly arrayed and affixed onto a frame 2 below the discharging position 6 of a bucket conveyor 5. An article feeding system 3 serving to feed individual article batches to the article batch handling units is disposed on an elevated part of the frame 2 and comprises a dispersion table 4 situated directly below the discharging position 6. Feed troughs 7 individually corresponding to the aforementioned article batch handling units and each having an article receiving zone and an article delivery zone are disposed radially along the periphery of the dispersion table 4, affixed on the frame 2 individually through electromagnetic vibrators 14 of a known kind. Below each of the feed troughs 7, there is connected thereto a pool hopper 8 mounted on the frame 2 for intitially receiving an individual article batch from the article feeding system 3. There is below each pool hopper 8 and corresponding thereto a weigh hopper 10 similarly mounted on a load cell 9 of a known type affixed to the frame 2 for receiving an article batch discharged from the associated pool hopper 8. Each weigh hoper 10 is adapted to discharge its contents such as peanuts (not shown) into a chute 11 arranged therebelow and onto a conveyor 15 for transporting such contents to a subsequent packaging process. A hopper-driving motor 16 is functionally connected through a gear means 17 to hopper-driving means 18 so as to cause reciprocating motions of push rods 21 and 22 for opening and closing gates 19 and 20, respectively, of the pool hoppers 8 and the weigh hoppers 10.

Figure 1:
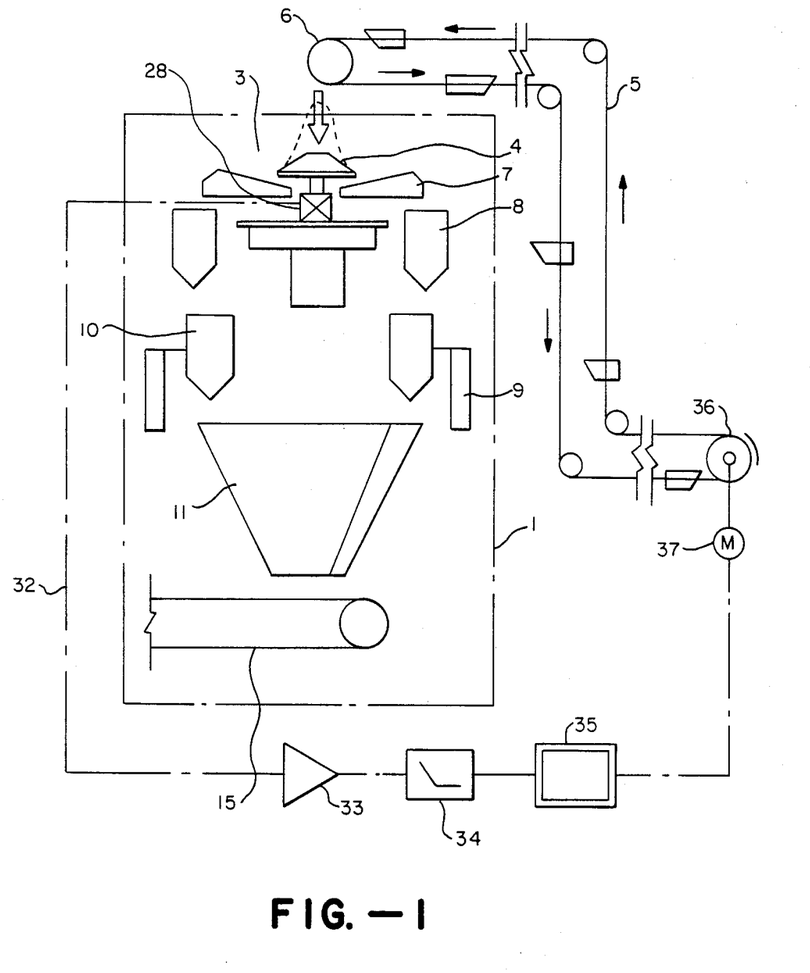
FIG. 1 generally illustrates the components of an automatic weighing system according to one embodiment of the present invention.
Figure 2:
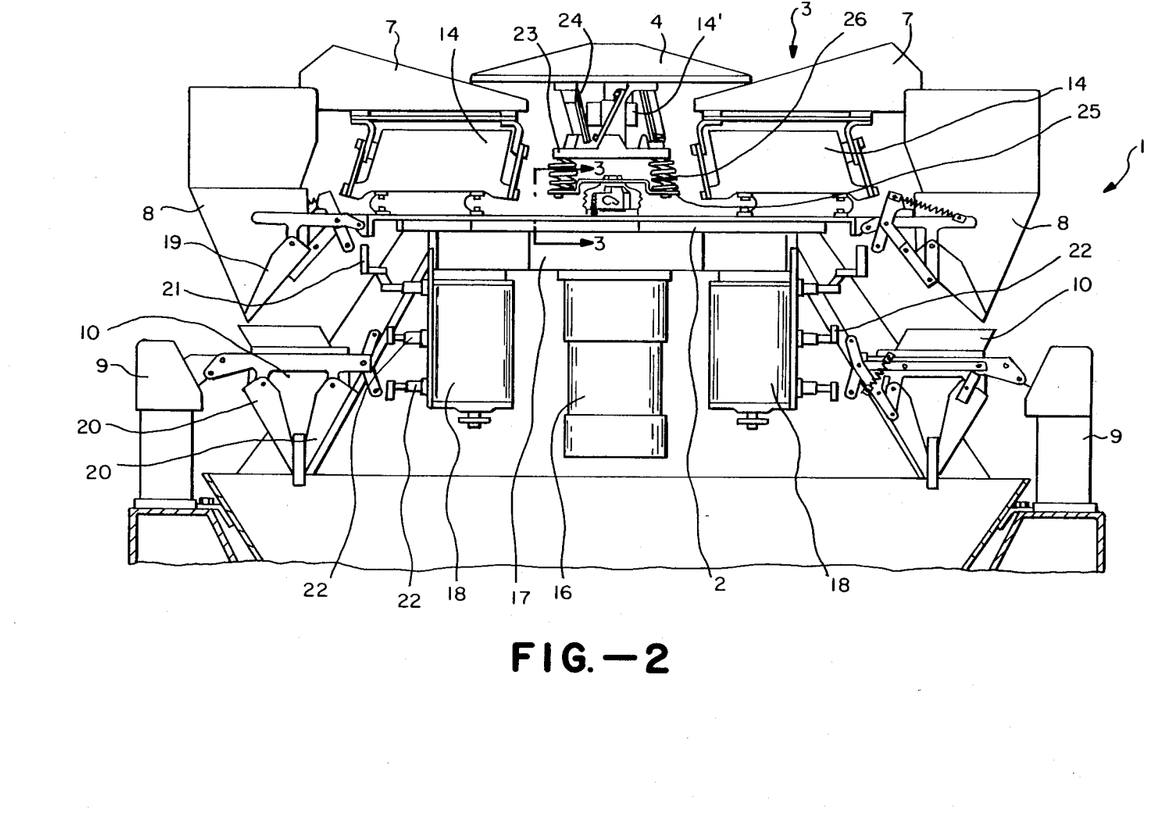
FIG. 2 is an enlarged side fragmentary view of an automatic weighing system of FIG. 1.
Figure 3:
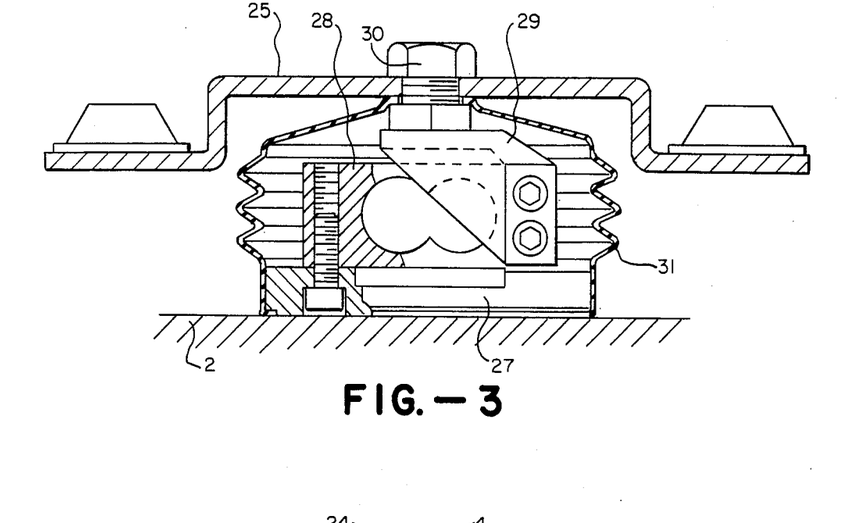
FIG. 3 is a further enlarged side view of a portion of the feeding device shown in FIG. 2 as seen in the direction rotated by 90° from that of the arrows 3 of FIG. 2.

The dispersion table 4 is mounted as shown in FIG. 2 on a balancing weight 23 through vertically inclining plate springs 24, and is also provided with an electromagnetic vibrator means 14' of a known type adapted to execute a rotational oscillation simultaneously with an up-and-down motion. The balancing weight 23, in turn, is mounted on a plate 25 therebelow through an appropriate number of cushion springs 26. The plate 25 is secured to a bracket 29 by a bolt 30 and the bracket 29 is affixed to a load cell 28 of a known type as shown in FIG. 3. The load cell 28 is attached by a bolt to a mounting disk 27 which, in turn, is secured to the frame 2. A dust boot 31 is provided enclosingly as shown between the bottom surface of the plate 25 and the frame 2. In summary, the aforementioned load cell 28 is adapted to become subjected through the plate 25 both to the vibrations of the articles to be weighed and to the high-frequency vibrations of the electromagnetic vibrator 14'. These vibrations detected by the load cell 28 are adapted to be inputted through a lead line 32 to an amplifier 33 and further through a low-pass filter 34 to a control means 35 for starting and stopping the conveyor motor 37 for the conveyor-driving means 36 as shown in FIG. 1.

When it is desired to start the operation of the weighing system 1, a starting button (not shown) is pressed to start the electromagnetic vibrators 14 and 14', the hopper-driving motor 16 and the conveyor motor 37 for the conveyor-driving means 36 so that the conveyor 5 starts moving and dropping the articles to be weighed from the discharging position 6 onto the dispersion table 4 of the article feeding system 3. The articles to be weighed are vibrated and dispersed towards the periphery of the dispersion table 4 and ejected at the periphery as article batches into the feed troughs 7. The articles to be weighed are further caused to travel radially along the feed troughs 7 into the respective pool hoppers 8 and then dropped into the weigh hoppers 10 below when the push rods 21 of the hopper-driving means 18 open the gates 19. The weight of the articles batch in each weigh hopper 10 is measured by the associated load cell 9 and the measured weights from the weigh hoppers are inputted to a computer (not shown) for a combinational computation to instantly select a particular combination. Various criteria for the selection of particular combination may be adapted such that the total weight from the selected article batch handling units should be within a preselected range or that it should be no less than a predetermined target weight and should also be the closest to it among all or a part of the possible combinations. The push rods 22 corresponding to the article batch handling units thus selected by the combinational computation are operated by a control means (not shown) receiving a signal from the computer and open the gates 20 of the corresponding weigh hoppers 10. The article batches in these hoppers are discharged into the chute 11 and taken away for packaging by the conveyor 15. In the meantime, the gates 19 of the pool hoppers 8 corresponding to the weight hoppers 10 which have just discharged their contents are opened similarly by a signal from the computer so that the article batches carried inside these pool hoppers are dropped into the corresponding weigh hoppers 10. Additional articles to be weighed are subsequently supplied into these pool hoppers 8 by the vibrational motion of the corresponding feed troughs 7.

Figure 10:
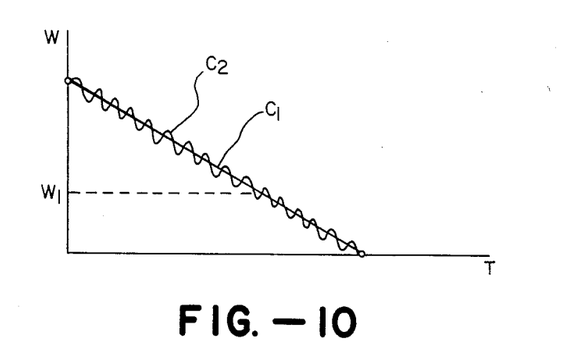
FIG. 10 is a graph which shows the relationship between the weight signal and the vibratory signal from the feeding device of an automatic weighing system.

While these cycles are repeated, the articles to be packaged are intermittently discharged below and intermittently supplied from the top as described above. As the articles to be weighed are supplied from the dispersion table 4 into the feed troughs 7 and from the feed troughs 7 into the pool hoppers 8, the weight W of the articles on the dispersion table 4 should decrease linearly with time T as shown by $C_1$ in FIG. 10. In reality, however, the net force exerted on the load cell 28 and detected by the amplifier 33 is, as shown by $C_2$, the sum of $C_1$ and the effects of the electromagnetic vibrator 14. The low-pass filter 34 is therefore adapted to remove the oscillatory component and to input only the linear component $C_1$ into the control means 35.

The control means 35 is programmed in such a way that the conveyor motor 37 will move the conveyor-driving means 36 to supply the articles to the article feeding system only when the weight W on the dispersion table 4 has fallen below a certain critical value ("starting weight") and to stop the motor 37, and hence the feeding, when W has further dropped by an amount nearly equal to the weight of the articles programmed to be discharged in each cycle ($W_1$). In view of the lag between the times when the motor 37 starts moving the conveyor-driving means 36 and when the articles begin to enter the pool hoppers 8, the starting weight should be substantially greater than $W_1$. The exact value of the starting weight, as well as that of the "stopping weight" which is another critical value of W at which the motor 37 is programmed to stop, can be determined by trials and experience for each type of articles to be weighed. Generally, the starting weight should be about 2–3 times $W_1$ and above the stopping weight by an interval of a little more than $W_1$. It goes without saying in this connection that the speed of the supply conveyor and the rate of supply to the conveyor (of the amount supplied into each bucket) must be adjusted properly.

It is to be understood that many variations of the embodiment described above are also within the purview of the present invention. For example, the signal detected by the aforementioned load cell 28 may be passed through a high-pass filter so that the vibration intensity and frequency of the electromagnetic vibrator 14' and thus the rate of supply from the dispersion table 4 to the feed trough 7 of from the feed trough 7 to the corrresponding pool hopper 8 is detected and that the supply rate can be controlled in accordance with the rate of intermittent discharge.

Figure 4:
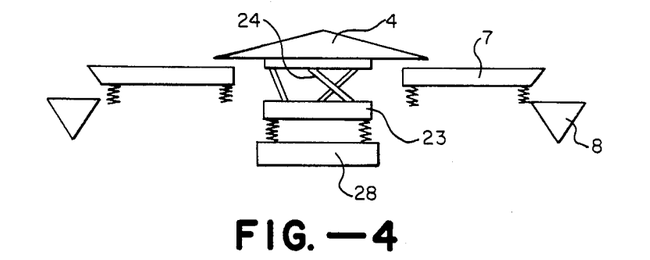
FIG. 4 is a drawing schematically showing the interrelationship of components of the feeding device, troughs and pool hoppers according to the embodiment of FIGS. 1, 2 and 3.
Figure 5:
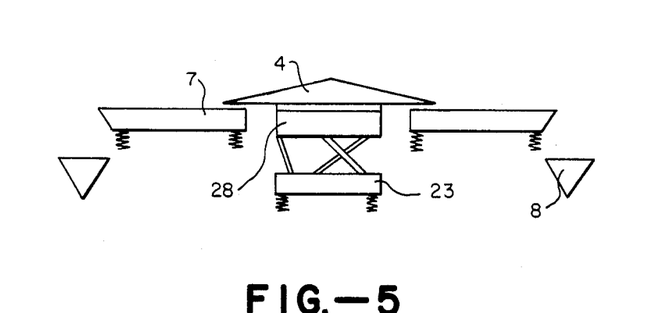
FIG. 5 is a drawing schematically showing the interrelationship of components of the feeding device, troughs and pool hoppers according to another embodiment of the present invention.
Figure 6:
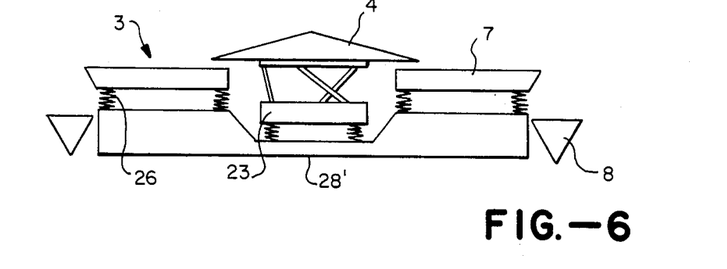
FIG. 6 is a drawing schematically showing the interrelationship of components of the feeding device, troughs and pool hoppers according to a third embodiment of the present invention.

The structure shown in FIG. 4 for the embodiment described above may be constructed as shown in FIG. 5 by providing the load cell 28 above the balancing weight 23 and the dispersion table 4 above the load cell 28. The structure may be rearranged further as shown in FIG. 6 by providing a load cell 28' which supports through cushioning springs 26 not only the dispersion table 4 but also the entire article feeding system 3 inclusive of the feed troughs 7. This design is advantageous in that the weight of the articles which have already spilled over from the periphery of the dispersion table 4 and are being transported by feed troughs 7 is also included.

Figure 7:
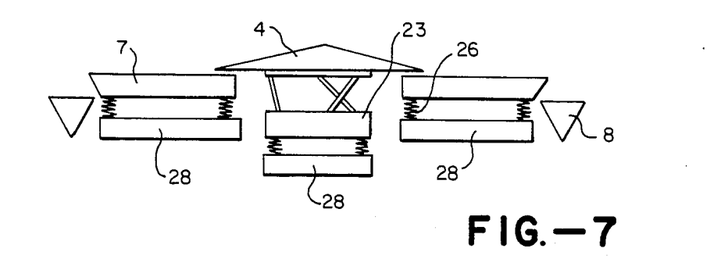
FIG. 7 is a drawing schematically showing the interrelationship of components of the feeding device, troughs and pool hoppers according to a fourth embodiment of the present invention.

The embodiment shown in FIG. 7 is characterized in that each feed trough 7 is provided with its own load cell 28. This design not only allows the measurements of the weights of the individual article batches but also enables the user to determine which article batch handling units is most frequently utilized. The user can use this information to adjust the frequency of the electromagnetic vibrator corresponding to its trough and/or the discharging position 6 of the conveyor 5 with respect to the dispersion table 4.

Figure 8:
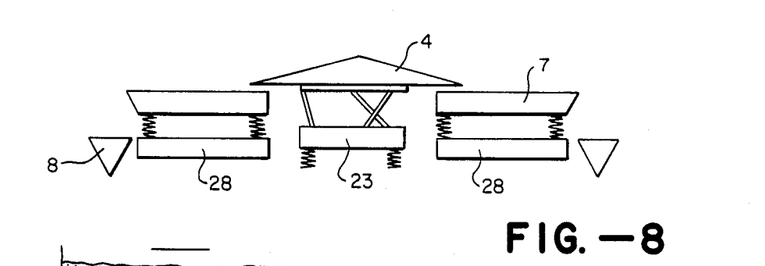
FIG. 8 is a drawing schematically showing the interrelationship of components of the feeding device, troughs and pool hoppers according to a fifth embodiment of the present invention.

According to the embodiment of FIG. 8, by contrast, there is no load cell supporting the dispersion table 4. Load cells 28 are provided only to the feed troughs 7. Measurements are taken while the article batches to be weighed are actually being transported into the individual pool hoppers.

Figure 9:
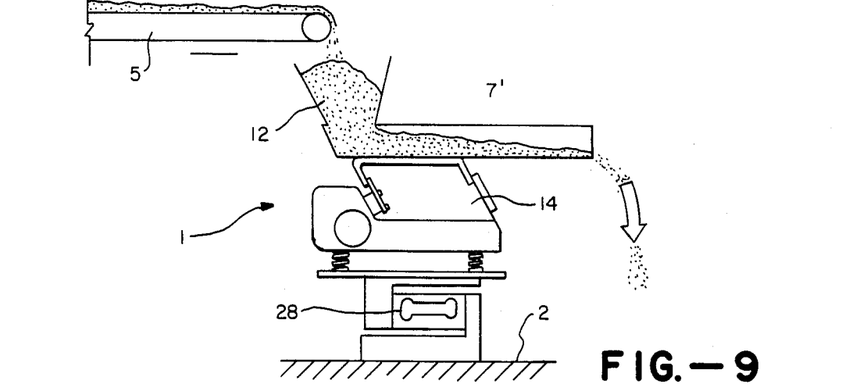
FIG. 9 is a drawing of an arrangement of components for feeding articles to be weighed according to a sixth embodiment of the present invention.

The present invention can be applied not only to a multi-head weighing system as described above but also to a single-head weighing system 1' as shown in FIG. 9. In this arrangement, the downstream end of the conveyor 5 is above the upstream end of a feed trough 7' to which a load cell 28 is provided so that the rate of supply to the feed trough 7' can be controlled. As in the previous examples, the weight of the articles being supplied by the trough 7' is detected by the corresponding load cell and the detection signal is passed through a low-pass filter to control the starting and stopping of the driving means for the conveyor 5.

Figure 11:
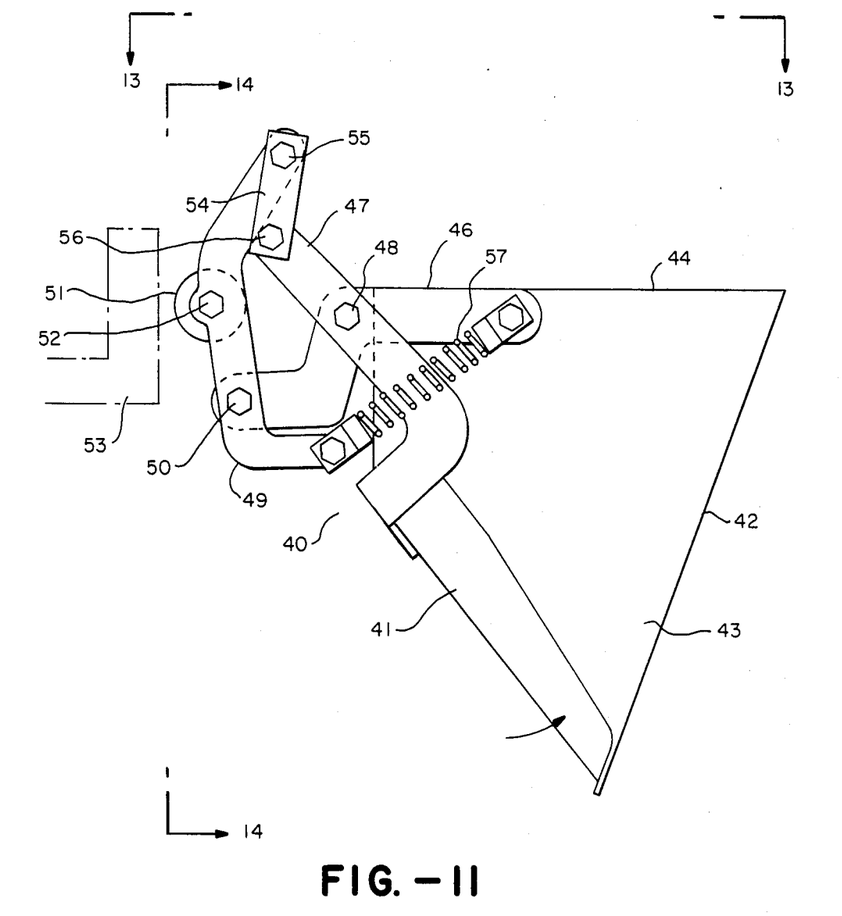
FIG. 11 is a side view of a hopper according to another embodiment, showing the hopper in the closed condition for storing articles.
Figure 12:
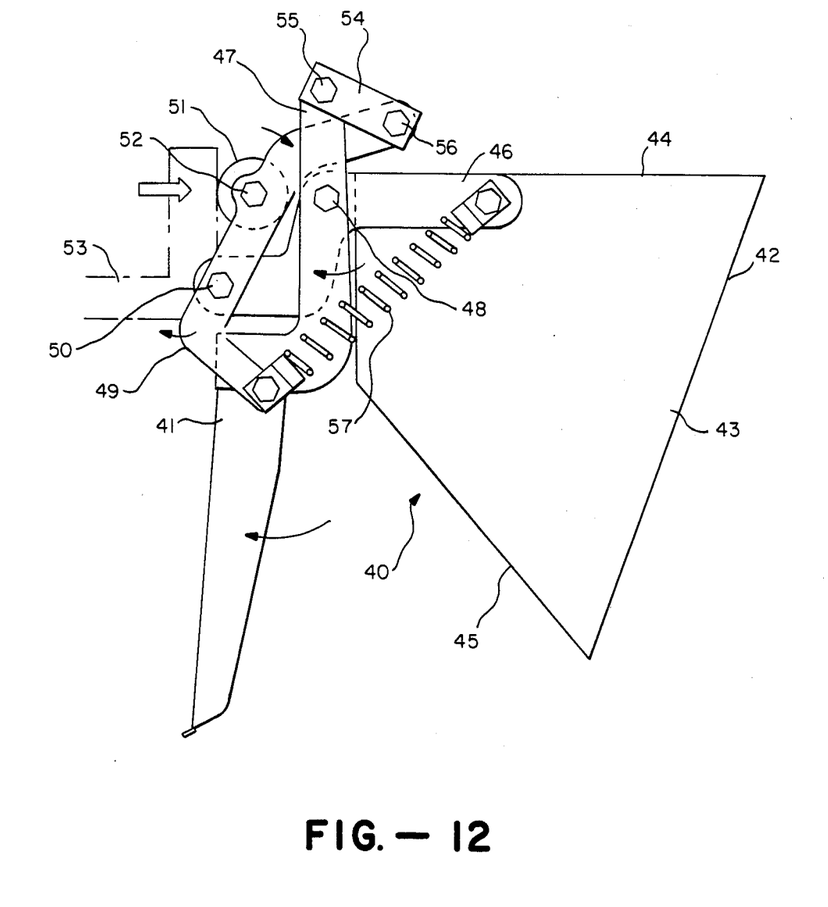
FIG. 12 is a view of the hopper of FIG. 11 in the open condition for discharge.
Figure 13:
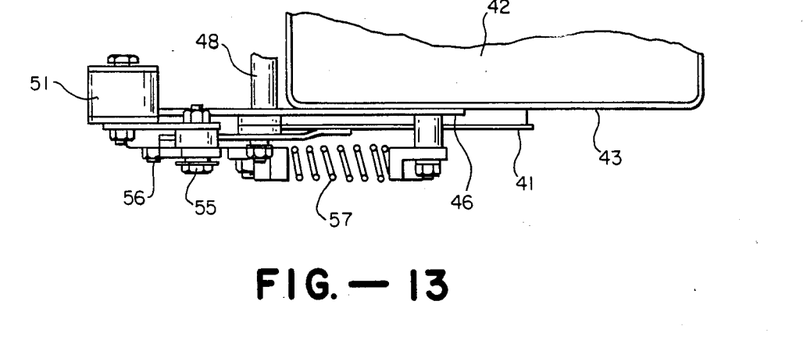
FIG. 13 is a fragmentary view in the direction of the arrows 13—13 of FIG. 11.
Figure 14:
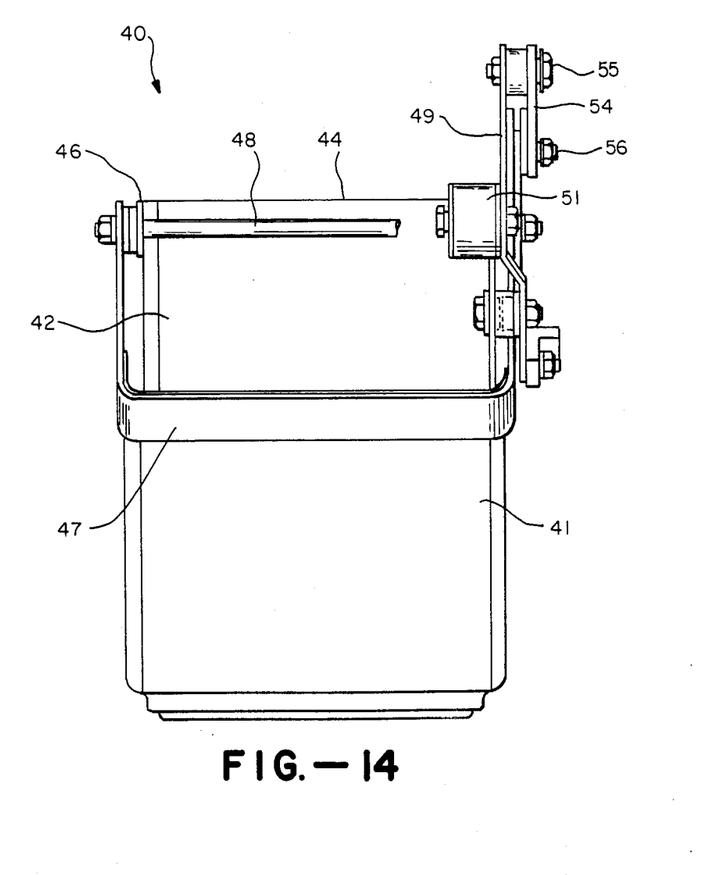
FIG. 14 is a partially sectional back view of the hopper in the direction of the arrows 14—14 of FIG. 11.

The embodiments illustrated in FIGS. 11-14 show an alternative hopper mechanism furnishing improved discharge characteristics. With reference to Figs. 11, 12 and 14, numeral 40 generally indicates a hopper such as the weigh hopper 10 of FIG. 2, including a gate 41 and a main body 42 comprising side walls 43 which define an inlet 44 at the top and an outlet 45 below. A pair of crank-shaped brackets 46 are secured to the upper portions of the side walls 43 and extend away from the main body 42. First L-shaped pieces 47 secured to the gate 41 are rotatably attached to the brackets 46 around an extended pin 48 which defines the axis of rotation for the gate with respect to the main body 42. A second L-shaped piece 49 is rotatably attached around a pin 50 to the distal end of one of the brackets 46 away from the main body 42. A roller 51 is rotatably attached to the second piece 49 around a pin 52 so that a pushing rod 53 (21 or 22 of FIG. 2) can move the second piece 49 by pressing the roller 51. A return connecting rod 54 connects the top ends of the L-shaped pieces 47 and 49 rotatably around pins 55 and 56 to complete a linkage system. A spring 57 is installed between the front end of the bracket 46 and the lower front end of the second L-shaped piece 49 so that its compressive biasing force through the aforementioned linkage system tends to keep the gate 41 in the closed condition with respect to the main body 42 as shown in FIG. 11 in the absence of an external force on the roller 51.

The hopper mechanism described above is characterized in that the radius of rotation of the pin 55 around the pin 50 is greater than that of the pin 56 around the pin 48. As a result, when the push rod 53 applies a horizontal force on the roller 51, the motion of the second piece 49 around the pin 50 causes the return connecting rod 54 to make a complete turn, causing the first piece 47 to rotate around the pin 48 and opening the gate 41 with a large angle with respect to the outlet 45 as shown in FIG. 12. It is to be noted in FIG. 11 that the weight of articles carried inside the hopper main body 42 will not cause the gate 41 to open because the return connecting rod 54 functions as a toggle. It is also to be noted in FIG. 12 that the gate 41 tends to move in the direction opposite to the pressing motion of the pushing rod 53. This makes the outlet opening sufficiently wide so that the articles carried inside the main body 42 can be discharged directly and smoothly without hitting the gate 41 or causing vibrations to the hopper body 42.

Figure 15:
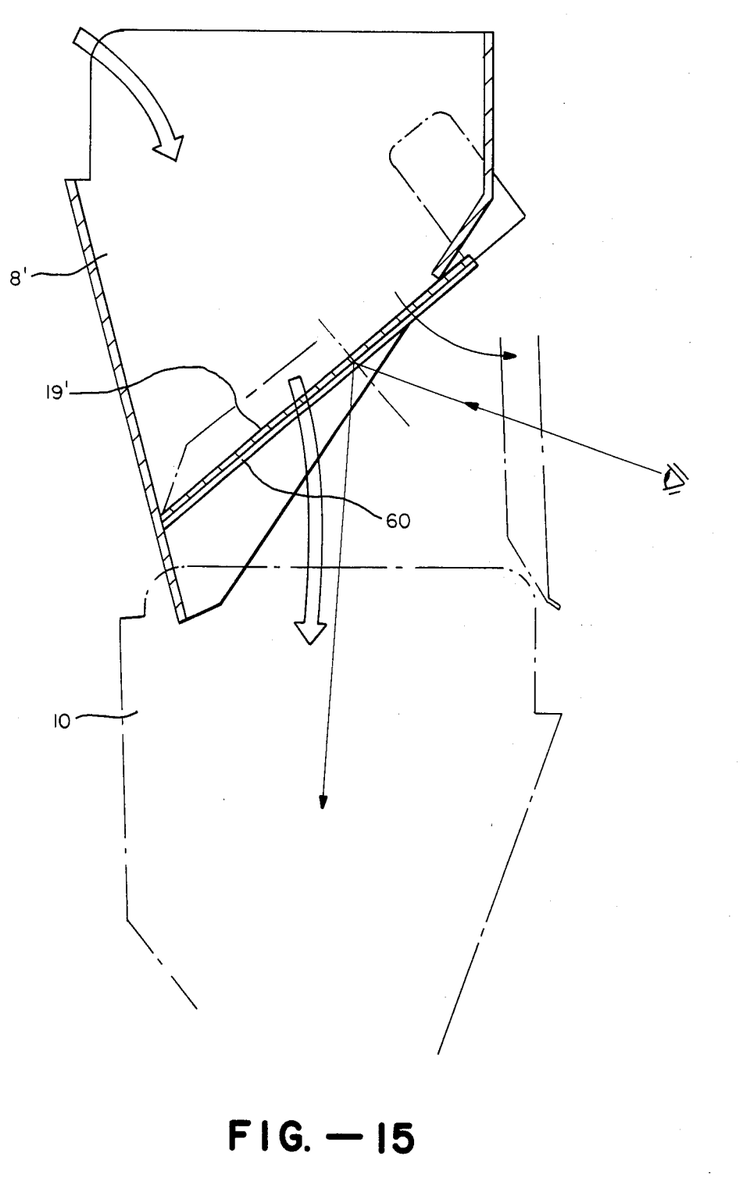
FIG. 15 is a sectional side view of a pool hopper according to the present invention showing a reflective surface.

The main bodies of the hoppers are preferably made of a stainless steel material. Since it is desirable to be able to visually inspect inside the weigh hoppers 10, a portion of the exterior wall of each pool hopper 8 may be made reflective by buffing. An example of such a pool hopper is illustrated in FIG. 15 wherein numeral 8' generally indicates a pool hopper of a type which opens in the external direction and numeral 60 indicates a reflective surface formed, for example, by buffing the external stainless steel side surface of the gate 19'. The reflective surface 60 is so oriented that the interior of the associated weight hopper 10 below can be observed easily and comfortably by a person of ordinary height at a reasonably safe distance. Although the gate 19' opens intermittently, visual inspection can be carried out not only while the system is at rest but also while the gate 19' is closed during an operation. It also goes without saying that a similar reflective surface can be provided to a pool hopper of a type which opens in two directions and that the reflective surface 60 may be separately prepared and attached to the gate 19'.

Figure 16:
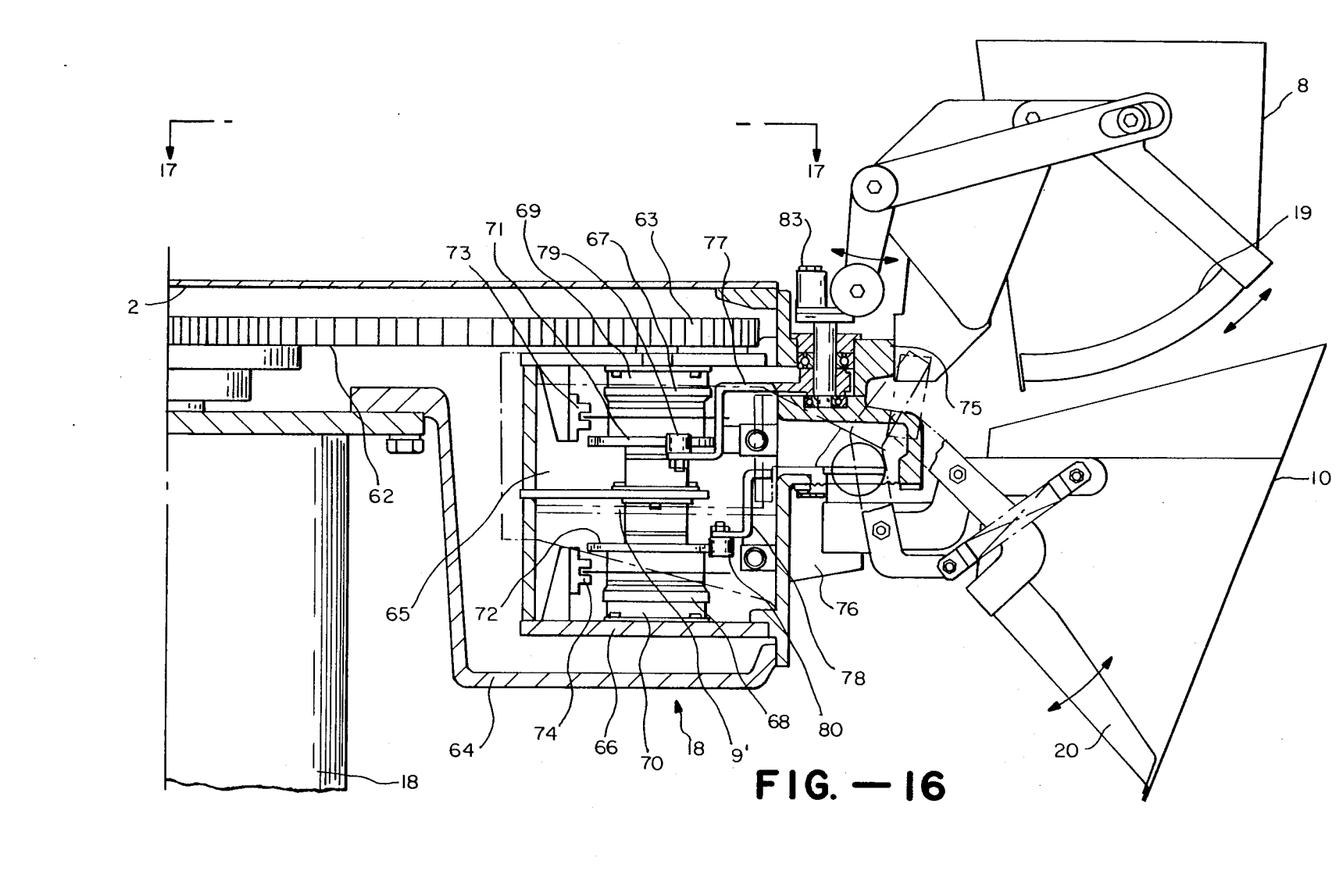
FIG. 16 is a partially sectional side view of a hopper-driving means according to the present invention.
Figure 17:
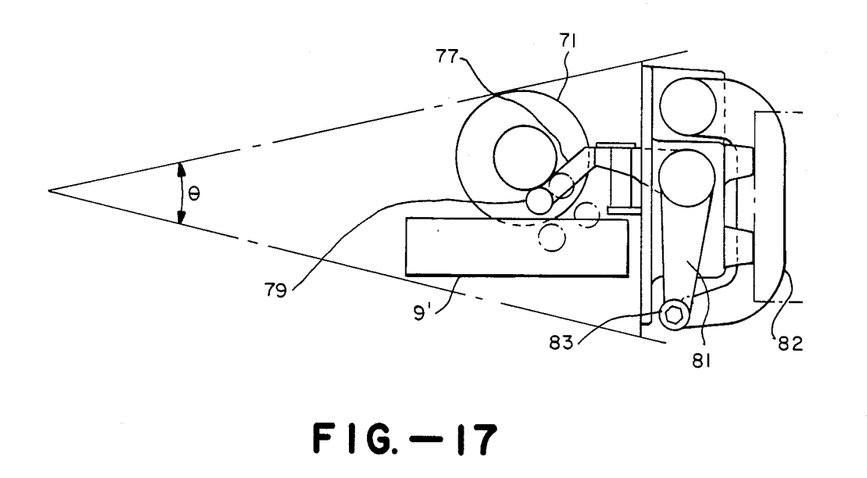
FIG. 17 is a plan view of a portion of the hopper-driving means of FIG. 16 in the direction of the arrows 17—17.

Regarding the mechanism for opening the gates 19 and 20 of the pool hoppers 8 and weigh hoppers 10 of Fig. 2, or the mechanism for transmitting the rotary motion of the hopper-driving motor 16 to the gates 19 and 20, FIGS. 16 and 17 show an alternative embodiment which is advantageous in that the push rods 21 and 22 adapted to execute linear reciprocating motions are dispensed with so that the hoppers 8 and 10 can be placed closer to the hopper-driving motor 16 and, hence, the floor space for the system 1 as a whole can be reduced. With reference to FIGS. 16 and 17, a center gear 62 affixed axially to the hopper-driving motor 16 is engaged with the same number of pinions 63 as there are article batch handling units. The pinions 63 are symmetrically distributed around the center gear 62 and each pinion 63 is disposed inside a gear case 64 which is affixed to the upper part of the frame 2. A drive shaft (not shown) is affixed to each pinion 63 and extends downward, supported rotatably by a casing 66 from below. The drive shaft passes through a hopper-driving control means 65 having a double-layer structure, the upper portion being adapted to control the motion of the associated pool hopper 8 and the lower portion to control that of the associated weigh hopper 10. The drive shaft is provided with two clutches 67 and 68 as well as two electromagnetic brakes 69 and 70 respectively for controlling the motion of the associated pool hopper 8 and weigh hopper 10. There are also cams 71 and 72 and photointerrupters 73 and 74 of a known type for stopping the motion of the cams 71 and 72 provided to the shaft. Brackets 75 and 76 are installed on an external surface of the gear case 64 and are connected to cam levers 77 and 78 respectively for the pool hopper 8 and the weight hopper 10. Each cam lever is somewhat L-shaped when seen from above (as shown in FIG. 17) and Z-shaped when seen horizontally (as shown in FIG. 16). The cam levers 77 and 78 are provided at their internal ends with cam followers 79 and 80 engagingly in contact respectively with the cams 71 and 72. At the external ends, they are connected respectively to opening levers 81 and 82 with a roller 83 (not shown for the weigh hopper 10) rotatably supported at the other end. Load cells 9' supporting the weigh hoppers 10 are disposed between the hopper-driving control means 65. The load cell 9' is of a commonly available type with a hole at the center. This allows the load cell 9' and the cams 71 and 72 to be disposed with respect to each other in a space-saving manner inside each hopper-driving control means 65. The cams 71 and 72 are arranged to partially occupy the space defined by the central hole of the load cell 9' as shown in FIG. 17. This compact arrangement of the cams 71 and 72 with respect to the load cell 9' makes it possible to minimize the angle theta horizontally distended by each control means 65 at the position of the central axis of the central gear 62.

When a signal is received after a combinational computation and the clutch 68 is activated, the cam 72 starts to rotate, causing through the opening lever 82 and the roller 83 at its end to move the linking means 84 to open the gate 20 of the weigh hopper 10. Another signal is adapted to activate the pool hopper clutch 67 after a predetermined time period. This similarly causes the pool hopper cam 71 to rotate and to open the pool hopper gate 19. After each cycle, the photointerrupters 73 and 74 are activated by a control means (not shown) to activate the electromagnetic brakes 69 and 70, stopping the cams 71 and 72 and to disengage the clutches 67 and 68. In summary, the mechanism according to this embodiment is advantageous not only because the apparatus can be made smaller as mentioned before but also because the rotary motion of the hopper-driving motor 16 is directly (or without converting it first into a linear reciprocating motion) applied to open the hoppers so that the energy associated with the rotary motion of the motor 16 can be utilized more efficiently.

Finally, the construction of the individual article batch handling units illustrated in a radial array above does not restrict the present invention. The batch handling means may be arranged in a side-by-side relationship or circularly. The number of hoppers or hopper-like means in each article batch handling unit may be modified. The hoppers 8 and 10 may be designed to open inwardly, outwardly or in both directions. Various other changes and modifications which will become apparent to persons skilled in the art are also contemplated to be within the scope of this invention.

What is claimed is:

1. An automatic weighing system comprising
   one or more separate article batch handling means for receiving, weighing, storing and discharging individual article batches,
   article feeding means serving to feed individual article batches to said separate article batch handling means,
   a conveyor driving means for driving a conveyor means for transporting articles to said article feeding means,
   a weight measuring means coupled to said article feeding means, and
   conveyor control means serving to acquire weight information from said weight measuring means and controlling the motion of said conveyor control means according to said weight information.

2. The automatic weighing system of claim 1 comprising a plurality of article batch handling means disposed in a circular arrangement, said article feeding means including a dispersion table, a table vibrating means for causing said dispersion table to vibrate, and separate feed troughs each having an article receiving zone and an article delivery zone associated with one of said article batch handling means, each of said article batch handling means including a pool hooper for initially receiving individual article batches from said article feeding means, a weigh hopper disposed to receive an article batch discharged from said pool hopper and a weighing means such as a load cell for weighing an article batch in said weigh hopper, said feed troughs being disposed in a radial array with article receiving zones thereof disposed towards the center of said array.

3. The automatic weighing system of claim 1 wherein each of said article batch handling means includes a pool hopper for initially receiving individual article batches from said article feeding means, a weigh hopper disposed to receive an article batch discharged from said pool hopper and a weighing means for weighing an article batch in said weigh hopper.

4. The automatic weighing system of claim 2 wherein either or each of said hoppers in each of said article batch handling means comprises
   a main frame defining an article receiving inlet and an article discharging outlet,
   a gate adapted to swing with respect to said main frame to open and close said article discharging outlet,
   a bracket affixed to and extending from said main frame, and a linkage means affixed to said gate and rotatably affixed to said bracket around an axis outside said main frame.

5. The automatic weighing system of claim 2 further comprising a hopper-driving motor adapted to cause rotary motion of a central gear, each of said article batch handling means including associated therewith a pinion engaged with said central gear, a drive shaft axially affixed to and adapted to rotate with said pinion and a hopper-opening means comprising a cam mounted on said drive shaft through a cam control means and a cam lever which is engaged with said cam through a cam follower and is adapted to undergo rotary motion and to thereby press said linkage means of one of said hoppers.

6. The automatic weighing system of claim 4 further comprising a hopper-driving motor adapted to cause rotary motion of a central gear, each of said article batch handling means including associated therewith a pinion engaged with said central gear, a drive shaft axially affixed to and adapted to rotate with said pinion and a hopper-opening means comprising a cam mounted on said drive shaft through a cam control means and a cam lever which is engaged with said cam through a cam follower and is adapted to undergo rotary motion and to thereby press said linkage means of one of said hoppers.

7. The automatic weighing system of claim 6 wherein each of said article batch handling means further includes a second hopper-opening means structured similarly to said hopper-opening means and adapted to open another of said hoppers.

8. The automatic weighing system of claim 6 wherein said cam control means includes a clutch and a brake.

9. The automatic weighting system of claim 1 wherein said weight measuring means is connected to said conveyor control means through a low-pass filter.

10. The automatic weighing system of claim 6 wherein said weight measuring means is connected to said conveyor control means through a low-pass filter.

11. The automatic weighing system of claim 2 wherein said weight measuring means is in functional relationship with the whole of said article feeding means.

12. The automatic weighing system of claim 6 wherein said weight measuring means is in functional relationship with the whole of said article feeding means.

13. The automatic weighing system of claim 2 wherein said weight measuring means is in functional relationship at least with said dispersion table.

14. The automatic weighing system of claim 6 wherein said weight measuring means is in functional relationship at least with said dispersion table.

15. The automatic weighing system of claim 2 wherein each of said feed troughs is provided with a separate trough vibrating means.

16. The automatic weighing system of claim 6 wherein each of said feed troughs is provided with a separate trough vibrating means.

17. The automatic weighing system of claim 2 wherein said pool hopper has a reflective surface thereon such that the interior of said weigh hopper can be visually inspected by light reflection on said reflective surface.

18. In an automatic weighing system including a hopper with a gate and a linkage system directly connected to said gate for controlling the motion thereof, a hopper gate operating means comprising a drive shaft adapted to rotate around its axis, a cam mounted on said drive shaft, and a rotatably supported lever means having a first end in an engaging relationship with said cam and a second end which moves along a circular orbit and can be separated from or pressed against said linkage system in an arcuate movement.

19. The automatic weighing system of claim 18 wherein said cam is mounted on said drive shaft through a cam control means which includes a clutch means adapted to connect and disconnect the motion of said drive shaft and the motion of said cam.

20. In an automatic weighing system which includes a plurality of hoppers arranged in a circular array, each hopper comprising a linkage means and a gate, said gate being adapted to be opened by application of an external force on said linkage means, a motor, a central gear connected to said motor, a plurality of gate control means each associated separately with one of said hoppers, each of said gate control means including a pinion engaged to said central gear, a drive shaft affixed to and adapted to rotate with said pinion, a cam mounted on said shaft through a cam control means which includes a clutch and a brake, a cam lever having a cam follower engaged with said cam, and a lever support means for supporting said cam lever rotatably, said cam lever being adapted to compress said linkage means.

21. In an automatic weighing system having article batch handling means, a hopper comprising a main body defining an article receiving upper opening and an article discharging lower opening, a gate adapted to swing with respect to said main body and to close said article discharging lower opening, a bracket secured to and extending from said main body, and a linkage means for linking said gate rotatably with said main body, said linkage means being secured at one end to said gate and rotatably affixed to said bracket around a pin to define an axis of rotation along said pin external to said main body, said linkage means containing a toggle means and being adapted to be subjected to an external force for opening said gate.

* * * * *

UNITED STATES PATENT AND TRADEMARK OFFICE
CERTIFICATE OF CORRECTION

PATENT NO. : 4,708,215
DATED : November 24, 1987
INVENTOR(S) : Nakamura, et al.

It is certified that error appears in the above-identified patent and that said Letters Patent are hereby corrected as shown below:

In the Abstract:

Line 5, delete "or" and insert ---of---; and

Column 3, line 30, delete "weight" and insert ---weigh---.

Signed and Sealed this

Nineteenth Day of April, 1988

Attest:

DONALD J. QUIGG

*Attesting Officer*     *Commissioner of Patents and Trademarks*